Feb. 29, 1944. E. B. JOHNSON 2,342,808
SHAVING MACHINE
Original Filed Dec. 15, 1938
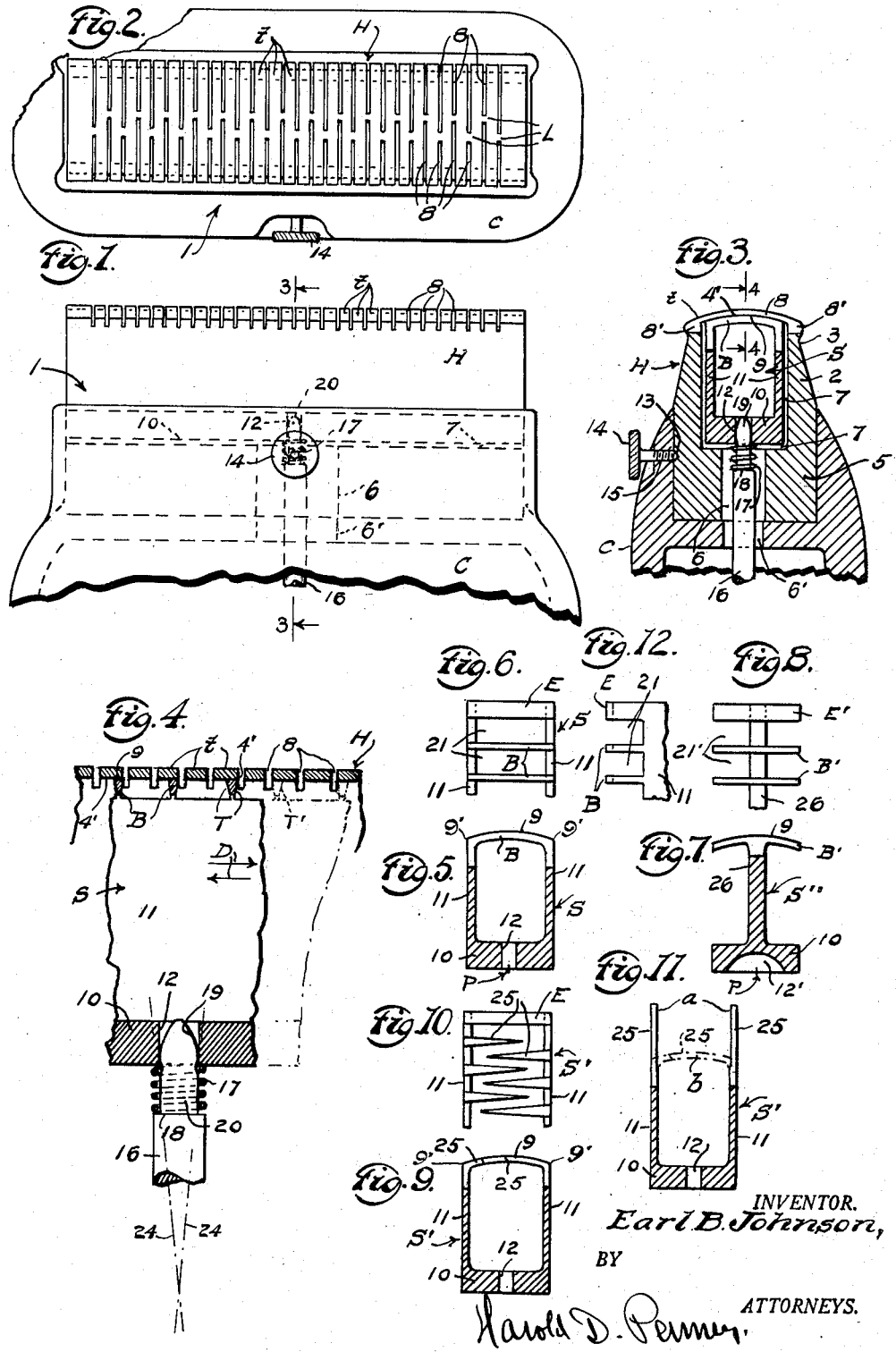
INVENTOR.
Earl B. Johnson,
BY
Harold D. Penney
ATTORNEYS.

Patented Feb. 29, 1944

2,342,808

UNITED STATES PATENT OFFICE 2,342,808

SHAVING MACHINE

Earl B. Johnson, Freehold, N. J.

Continuation of application Serial No. 245,870, December 15, 1938. This application September 2, 1942, Serial No. 456,970

18 Claims. (Cl. 30—43)

This invention relates to improvements in shaving machines, with particular reference to the shearing head, comprising a novel form of outer and inner cutter.

The primary object of this invention is to provide a fixed but removable, outer metal cutter guard with a smooth, rounded cutting surface thus providing a continuous cutting area from side to side, and from end to end of the entire cutting surface.

Another object is to provide a shearing head that will cut close when held at angles varying to the surface being shaved and pick up and shear hairs that lay in any direction when moved back and forth against the skin.

Another object provides an outer cutter guard with integral cutting teeth thin enough for close shaving and strong enough to independently and firmly hold its shape, without flexing, when pressed against the skin.

A further object is to provide the outer cutter guard with closed or bridged places in the slots across its top. These bridged places serving as a tie between each section of the cutter bars on the guard to strengthen and rigidify the thin cutting blades and also to pick up the hairs that lay parallel to the slots as the shaving surface of the guard is passed back and forth against the skin.

A still further object is to provide a closed slot outer cutter guard that utilizes the entire cutting area of a long stroke inner cutter.

A further object also, is to provide a movable, long stroke inner cutter with integral teeth or cutter bars spaced far enough apart to prevent the packing of hair and dead skin tissue between them.

Still another object is to provide an inner cutter that does its cutting during the first, third and last third of each reciprocating stroke at points in each revolution of the motor, when it is operating at its greatest efficiency and power.

Another object is to provide a single, curved face inner cutter that aligns itself perfectly to the inside face of the curved guard cutter, the contacting cutting areas being the only point of contact with the outer guard cutter when suitably held in operative assembly.

With these and other objects in view the invention resides in certain novel construction and arrangement of parts, the essential features of which are hereinafter fully described, are particularly pointed out in the appended claims and are illustrated in the accompanying drawing in which each figure is shown on an enlarged scale.

In the drawing,

Fig. 1 is an enlarged side view, in elevation, showing the present shear head, with the casing broken away;

Fig. 2 is a plan view of Fig. 1;

Fig. 3 is a transverse sectional view, taken on the line 3—3, Fig. 1, looking in the direction of the arrows;

Fig. 4 is an enlarged longitudinal sectional view, taken on the line 4—4, Fig. 3, looking in the direction of the arrows;

Fig. 5 is a transverse sectional view of the inner cutter, similar to the section thereof shown in Fig. 3;

Fig. 6 is a fragmentary plan view of Fig.5;

Fig. 7 is a transverse sectional view of a modified form of inner cutter;

Fig. 8 is a fragmentary plan view of Fig. 7;

Figs. 9, 10 and 11 are transverse sectional, fragmentary plan and transverse sectional views respectively of a modified form of an inner cutter;

Fig. 12 is a fragmentary side view of the cutter shown in Fig. 6.

The present shear head comprises a preferably metal outer, fixed cutter guard generally denoted by H, Fig. 3, and an inner, reciprocable cutter, generally denoted by S. The guide is provided with an elongate open-ended bore in which the cutter is mounted for elongate reciprocation therein.

The guard H is removably mounted by its base 5 into a seat in the casing C, and is held in operative assembly in said casing by a pointed thumb screw 14, which is threaded into casing C the point of which is entered into an indent 13, which is located in base 5. By unscrewing screw 14, the shear head assembly H—S may be lifted upwardly and removed from its seat in casing C.

The cutter guard H, and the inner cutter are provided with cylindrically curved transversely arranged cutter bars t and B, respectively, Fig. 3, the curves of which are developed from a center or radius point P, at the base of the inner cutter, Figs. 5 and 7, so that all of the cylindrical surfaces of the cutter teeth of both the guard and inner cutter are concentric to each other.

This curved construction of the cutter teeth permits of true cutting action at any reasonable angle of the instrument to the surface of the skin.

The guard H, generally, is normally of such dimensions and thickness to serve its purpose, the curved cutter bar portion t, however, is made extremely thin so as to permit of a close shave.

The teeth t of the cutter guard are formed by interrupted, narrow traversing slots 8, Figs. 1, 2 and 3, the outer terminals thereof openly terminating in the overhanging, opposite edge beads 8'—8'.

As will be seen in Fig. 1, the teeth t are formed by slots 8—8, none of which completely traverse the cutting face, but are interrupted by connecting bridges L. The bridges L between the successive teeth t, Fig. 2 are alternately staggered relatively along the entire row of teeth. This bridging longitudinally and transversely reinforces the cutting face of the guard, and permits the use of teeth of extreme thinness, for close shaving.

The bridges L provide a continuation of the shearing edges of the teeth t from one side of each slot 8 to the opposite side of the same slot.

The cutter guard H is provided with a bore 6 in its base 5, said bore being located in the longitudinal and transverse mid-section of the base, Figs. 1 and 3, said bore being sufficiently large to permit the entry therethrough and the oscillation therein, of an oscillating fulcrum rod 16, Fig. 3. This rod 16 is rapidly oscillated in the usual well known manner by electrically operated means not shown, but which is well known in this art.

The upper end of the rod 16 has a developed cam end 19, which extends into and fits a bore 12, in the base 10 of the inner cutter S as shown in Figs. 3 and 4. The end of the rod carrying the cam 19 is reduced, and thus provides a shoulder 18, upon which is mounted a compression spring 17, which, when the shearing apparatus is in operative assembly tends at all times to keep the top cutting surface 9 of the teeth B of the inner cutter S in constant operative contact with the under surface of the teeth t on the guard H, thus to form a co-acting shearing line contact 4', as shown in Figs. 3 and 4.

The compression spring 17 engages the base 10 of the inner cutter substantially near the center and pivot point p of the cylindrical surfaces of the cutter guard and inner cutter, and causes a component of the pressure of the compression spring 17 to be applied substantially normally with respect to any longitudinal line of the cylindrical surfaces. Because of this normal pressure, whenever a hair gets between the cutter and guard and the co-acting shearing line 4', substantially the entire effective pressure of the spring is directed to that hair and the pressure is substantially the same no matter at which longitudinal line of the cylindrical surface the hair is.

The cam end 19 of rod 16, when in the bore 12, Fig. 4, acts as a gear tooth in said bore to permit of oscillatory, angular movement of the rod 16 in said bore and to fit said bore at any part of the angular rod motion, and to prevent rattle of the co-acting parts.

In detail the inner cutter S, as shown in Figs. 5 and 6, comprises a base 10 having a rod engaging bore 12 therein, and has two upstanding side walls 11 in spaced and parallel relation these side walls being joined by a plurality of cylindrically faced, traversing cutter bars B, the curved face of which fits the trough formed by the curve of the inside face of the guard cutter teeth t. The teeth B are widely spaced from each other, and are a little wider than the slots 8 in thickness, for purposes hereinafter to be described.

The inner cutter S, Fig. 3 due to the cylindrical arrangement of its cutting teeth and the contact thereof with the circular teeth of the guard cutter is operatively seated in the inner cylindrical trough of the guard cutter and due to the pressure of the spring 17, is firmly held seated therein, with little or no tendency, aside from the longitudinal, reciprocal cutting movement imparted by the rod 16, to move sidewise.

To provide for a lessening of friction to the oscillatory inner cutter S, and as will be noted in Fig. 3, a clearance 7 is provided all round between the side and bottom of the inner channel in the guard cutter H and the outer surface of the walls 10 and 11 of the inner cutter. Thus the inner cutter is held in operative sliding and cutting position by and between the spring 17 on the cam end 19 of the rod 16 and the trough formed by the cylindrical inner cutting face of the guard cutter teeth t.

In operation, the rod 16, properly pivoted and connected to a prime mover not shown, is rapidly oscillated sidewise of the shear head, as per the dotted angle lines 24—24, Fig. 4, and thus causes the inner cutter to rapidly reciprocate in the direction of the arrows D, Fig. 4. As the shear is moved over the skin the hairs enter the slots 8, and are sheared off by the cutter teeth 9.

The modified inner cutter S' shown in Fig. 7 operates as described for the cutter S in Fig. 4, and is constructed with a base 10 carrying an upstanding central web 26, on the outer edge of which is mounted a plurality of curved cutter teeth B', exactly like teeth B on cutter S the base 10 is provided with a slot 12', which engages with the cam 19 of rod 16.

As seen in Fig. 8, the teeth B' are widely spaced apart by spaces 21', and there is located at each end of the cutter a wide terminal tooth E'.

The spacing or pitch of the teeth B' is twice the pitch or spacing of the teeth t of the guard cutter H, so that, as described for the inner cutter S of Figs. 4, 5 and 6, when the inner cutter S' is reciprocated, if its longitudinal motion is equal to two and one half times the pitch of teeth t of the cutter H, so that the stroke of the inner cutter bar carries the teeth B' past two slots 8 thus cutting twice with each half reciprocation.

This amplitude of stroke of cutter S' or S thus causes four cuts for each full reciprocation of the cutter S' or S, because each tooth B' or B passes over two slots 8 on each half reciprocation as shown in Fig. 4, in full lines at T and dotted lines at T'.

The modified form of inner cutter shown in Figs. 9, 10 and 11 shows that while the cutter S', in cross section, is similar to the cross section of the cutter S of Fig. 5, the cutting teeth 25 thereon are constructed to form alternately disposed, angularly edged teeth. To this end, as shown in Fig. 11, the teeth are first formed as separate upstanding teeth 25, which terminate in separate angular apices a. While in the position shown in Fig. 11, the side edges of the teeth are undercut, as shown in Fig. 4 at T, thus to form a double shearing cutting edge at the cutting plane 4'.

After the teeth 25 have been angled at the opposite cutting edges, they are then curved downwardly to a position b, shown dotted in Fig. 11, and in full lines in Fig. 9, and when viewed in the plan, as in Fig. 10, the teeth 25 are then in alternate, staggered and spaced cutting positions, the outer sharp ends being free. The angular conformation of the teeth 25 act as a double angular shear, in conjunction with the transverse teeth t of the guard cutter H, during reciprocation. The end pieces E, Figs. 6 and 10, may be welded on or otherwise suitably attached to the side walls 11.

The angular conformation of the teeth 25 and the double angular shear cause the edges of the teeth 25 to shear angularly along the edge of the teeth t at the shearing line 4' and toward the connecting bridges L thereby to trap and cut hair at the corners of the slots 8 and the bridges L at the shearing line 4'.

By referring to Figs. 5 and 9 it will be noted that the curved faces 9 of the guard cutters S of these figures merge into the side walls 11—11 and thereby form square shoulders 9'—9' thereby to form a substantially square combing shoulder for affording ready entrance of the hair or stubble in between the slots 8 of the cutting blades t.

This application is a continuation of my application Serial No. 245,870 filed December 15, 1938, which was a continuation in part of my application Serial Number 193,462, filed March 2, 1933.

Having thus described the invention, what is claimed is:

1. A shaving machine comprising an elongated shaving head having a guard outwardly curved substantially concentrically about an axis longitudinal to the guard remote from the guard, the head being provided with closely spaced hair-receiving transverse slots forming cutting bars therebetween having cutting edges extending substantially across the guard; said slots extending partly across the guard; said bars being connected by bridging connections forming ends of adjacent slots and having cutting edges joining cutting edges of the slots; an elongated cutter within the head formed with transverse cutter elements having cutting edges intersecting said edges of the slots and bridging connections at inclined angles thereby to move the hairs along the connections and bars to corners of the slots to trap hairs in the corners of the slots at the bridging connections; and means for causing longitudinal reciprocation of the cutter; said cutter having side members on which said cutter bars are respectively secured fast in staggered relation and shaped to form tapering cutter teeth having the wide ends secured fast on members, each tooth tapering substantially to its other end and having cutting side edges angularly intersecting and cutting edges of the slots; the narrower free ends of the teeth carried by each side member terminating short of the other side member and far enough under the bridging connections most remote from such side members to trap and catch hairs at corners of the guard slots at the bridging connections and being disposed in slightly overlapping staggered relation with the teeth carried by the other side wall, leaving only one tooth at its wide end for each two cutter bars, thereby leaving between the bars wide spaces near the side members, and leaving remote from the side wall, one tooth for each cutter bar and narrower spaces therebetween; thereby at any instant to render ineffective every second cutting bar near the side edges of the guard where the larger percentage of hairs are cut, thereby to reduce the maximum power requirement, and to render effective, near said connections, all of the bars each time any tooth cuts.

2. A shaving machine comprising a shaving head having a guard provided with spaced hair-receiving slots and inner cutting edges; a reciprocatory cutter having a cutting face yieldably engaged with the inner face of the guard; said edges being transverse to the direction of reciprocation; said cutter being so mounted and driven that it is free to move transversely to the path of reciprocation during the reciprocation.

3. A shaving machine comprising a shaving head having a guard provided with spaced hair-receiving slots and inner cutting edges; a cutter having cutting elements forming a cutting face engaged with the inner face of the guard; reciprocatory means for reciprocating the cutter relative to the guard; said edges and elements being transverse to the direction of reciprocation; and yieldable means for pressing the cutter into yieldable contact with said guard; said head, cutter, yieldable means and reciprocatory means being so constructed and arranged that the cutter during reciprocation is free to move transversely to a path of said reciprocation.

4. A shaving machine comprising an elongated shaving head having a guard outwardly curved substantially concentrically about an axis longitudinal to the guard remote from the guard and provided with spaced hair-receiving transverse slots and cutting edges; an elongated cutter longitudinally and transversely slidably engaged with the inner face of the guard and having transverse cutter elements curved to have cutting engagement with the inner face of the guard; reciprocatory means for longitudinally reciprocating the cutter; and yieldable means pressing on said cutter near said axis for pressing the cutter into yieldable cutting contact with the guard; said reciprocatory and yielding means being so arranged and constructed that the cutter is free to move transversely of its path of reciprocation during the reciprocation.

5. A shaving machine comprising a shaving head having a guard provided with spaced hair-receiving transverse slots and inner lateral cutting edges adjacent to the slots; individual slots having end inner cutting edges joining the lateral cutting edges; a cutter within the head formed with cutter elements each having cutting edges engaged with the inner face of the guard; and means for causing reciprocation of the cutter; lateral cutting edges of the cutter intersecting the cooperative lateral and end cutting edges of the guard at inclined angles to the cutting edges of the guard to move the hairs that fall into the slots along the lateral cutting edges to the end cutting edge to trap and cut the hairs in the corner of the slot at the end cutting edge.

6. A machine as in claim 5, the cutting edges of the same element converging to the end cutting edge to cause the hairs to be moved toward the end cutting edge when the cutter moves in either direction.

7. A shaving machine comprising an elongated shaving head having a guard the major portion of which is provided with spaced hair receiving transverse slots and lateral cutting edges extending partly across the guard, the cutting edges of the slots connected at the ends of the slots by end cutting edges joining cutting edges of the slot; an elongated cutter within the head formed with cutter elements having cutting edges on both sides of the elements engaged with the inner face of the guard; and means for causing longitudinal reciprocation of the cutter; the cutting edges of each cutter element during both directions of movement intersecting lateral and end cutting edges at an inclined angle to the lateral edges, thereby, when the cutter reciprocates, to move the hairs that fall into the slots to the end cutting edges to trap and cut the hairs in corners of the slots during both directions of movement.

8. A shaving machine comprising an elongated shaving head having a guard the major portion of which is provided with spaced hair receiving transverse slots and lateral cutting edges; individual slots extending partly across the guard, sides of the slots being connected by bridging connections forming ends of slots and having end inner cutting edges joining cutting edges of the slots; an elongated cutter within the head formed with cutter elements engaged with the inner face of the guard; and means for causing longitudinal reciprocation of the cutter; cutting edges of cutter intersecting the cooperative lateral and end cutting edges of the guard and bridging connections at an inclined angle to the lateral edges.

9. A machine as in claim 8 adjacent bridging connections being relatively staggered or off-set from each other.

10. A machine as in claim 8, cutting edges of the same element converging to the associated cutting edge.

11. A shaving machine comprising an elongated shaving head having a guard the major portion of which is provided with spaced hair receiving transverse slots and lateral cutting edges; individual slots extending partly across the guard, sides of the slots being connected by narrow bridging connections forming ends of slots; an elongated cutter within the guard formed with cutter elements engaged with the inner face of the guard; and means for causing longitudinal reciprocation of the cutter; cutting edges of cutter elements intersecting the cooperative lateral cutting edges of the guard; said connections being remote from a mid-central line lengthwise of guard.

12. A shaving machine comprising an elongated shaving head having a guard the major portion of which is provided with spaced hair receiving transverse slots and inner cutting edges; individual slots extending partly across the guard, sides of slots being connected by narrow bridging connections forming ends of slots, an elongated cutter within the head formed with cutter elements engaged with the inner face of the guard; and means for causing longitudinal reciprocation of the cutter; adjacent bridging connections being relatively offset from each other.

13. A shaving machine comprising a shaving head having a guard outwardly curved substantially concentrically about an axis of curvature spaced from the guard, said guard being provided with spaced hair-receiving slots and inner cutting edges; a cutter having cutter elements forming a cutting face cooperating with said edges, the cutter being slidably yieldably engaged with the inner face of the guard; reciprocating drive means for reciprocating the cutter, the drive means engaging the cutter substantially at said axis; said cutter and drive means being so mounted, connected and driven that the cutter is free to move transversely to, and free to remain in, the path of reciprocation of the cutter during the reciprocation.

14. A shaving machine comprising a shaving head having a guard outwardly curved substantially concentrically about an axis of curvature spaced from the guard, said guard being provided with spaced hair-receiving slots and inner cutting edges; a cutter having cutter elements forming a cutting face cooperating with said edges, the cutter being slidably engaged with the inner face of the guard; reciprocating drive means for reciprocating the cutter in a path substantially parallel to said axis, the drive means engaging the cutter substantially near said axis; said elements being substantially transverse to the direction of reciprocation; said cutter and drive means being so mounted, connected and driven that the cutter is free to move transversely to the path of reciprocation of the cutter during the reciprocation.

15. A shaving machine comprising a shaving head having a guard outwardly curved substantially concentrically about an axis inwardly spaced from the guard and provided with spaced hair-receiving transverse slots and cutting edges; a cutter within the head having outer elements curved to have cutting engagement with the inner face of the guard, connection means for reciprocating the cutter having effective connection with the cutter near said axis at a point substantially in a plane extending through the axis to near the middle line of said guard; said connection means being so constructed and arranged and connected to the guard that the cutter is substantially free to move at the guard transversely of its path of reciprocation; and yieldable means pressing on said cutter near said axis for pressing the cutter into yieldable cutting contact with the guard.

16. A shaving machine comprising an elongated shaving head having a guard provided with spaced hair-receiving transverse slots and inner cutting edges; an elongated cutter within the head having cutter elements forming a cutting face adapted for cutting engagement with the inner face of the guard; pressing means for pressing the cutter into yieldable contact with said guard; said pressing means having its pressing force directed normal to said faces at all longitudinal lines of said faces; and means for reciprocating the cutter longitudinally only.

17. A shaving machine comprising a shaving head having a guard outwardly curved substantially concentrically about an axis longitudinal to the guard remote from the guard and provided with spaced hair-receiving transverse slots and cutting edges; a cutter longitudinally and transversely slidably engaged with the inner face of the guard and having outer elements forming a cutting face curved to have cutting engagement with the inner face of the guard; drive means for reciprocating the cutter; and pressing means having effective connection with said cutter near said axis for pressing the cutter into yieldable cutting contact with the guard.

18. A shaving machine comprising a shaving head having a guard outwardly curved substantially concentrically about an axis longitudinal to the guard remote from the guard and provided with spaced hair-receiving transverse slots and cutting edges; a cutter longitudinally and transversely slidably engaged with the inner face of the guard and having outer elements forming a cutting face curved to have cutting engagement with the inner face of the guard; drive means for reciprocating the cutter; and pressing means having effective connection with said cutter near said axis for pressing the cutter into yieldable cutting contact with the guard; whereby when a hair comes between the cutter and the guard at any longitudinal line of the guard and forces the cutter back from the guard, substantially the entire force of the yielding means is directed to said line substantially normally to the guard at said line.

EARL B. JOHNSON.